(12) United States Patent
Kraatz et al.

(10) Patent No.: US 12,141,213 B2
(45) Date of Patent: Nov. 12, 2024

(54) SYSTEM AND METHOD OF UPDATING CONTENT SERVER METADATA

(71) Applicant: SHINYDOCS CORPORATION, Waterloo (CA)

(72) Inventors: Mark Kraatz, Waterloo (CA); Peter Vanleeuwen, Guelph (CA); Gorgi Terziev, Strumica (MK); Benjamin Barth, Waterloo (CA); Robert Haskett, Kitchener (CA); Khalid Merhi, Kitchener (CA); Tracy Grady, Kitchener (CA)

(73) Assignee: SHINYDOCS CORPORATION

( * ) Notice: Subject to any disclaimer, the term of this patent is extended or adjusted under 35 U.S.C. 154(b) by 187 days.

(21) Appl. No.: 17/655,572

(22) Filed: Mar. 21, 2022

(65) Prior Publication Data

US 2022/0300563 A1    Sep. 22, 2022

Related U.S. Application Data

(60) Provisional application No. 63/163,222, filed on Mar. 19, 2021.

(51) Int. Cl.
*G06F 16/951* (2019.01)
*G06F 16/27* (2019.01)

(52) U.S. Cl.
CPC ............ *G06F 16/951* (2019.01); *G06F 16/27* (2019.01)

(58) Field of Classification Search
CPC ....... G06F 16/951; G06F 16/27; G06F 16/355
USPC .......................................... 707/634
See application file for complete search history.

(56) References Cited

U.S. PATENT DOCUMENTS

| | | | |
|---|---|---|---|
| 2007/0055691 A1* | 3/2007 | Statchuk | G06F 16/31 707/999.102 |
| 2016/0063021 A1* | 3/2016 | Morgan | G06F 16/182 707/754 |
| 2017/0060856 A1* | 3/2017 | Turtle | G06F 16/00 |

* cited by examiner

*Primary Examiner* — Michael Pham

(57) ABSTRACT

A system and method of updating Content Server metadata on order to update and re-organize documents in a content management system (i.e., Content Server). A content management system includes a tool for setting Content Server metadata attributes, based in values in the index. Content Server Category Attributes can be set, as can Content Server Classification values, as can Content Server RM Classification values.

8 Claims, 3 Drawing Sheets

SYSTEM AND METHOD OF UPDATING CONTENT SERVER METADATA

CROSS REFERENCE TO RELATED APPLICATION

The application claims priority and the benefit of U.S. Provisional Patent Application Ser. No. 63/163,222, entitled "SYSTEM AND METHOD OF UPDATING CONTENT SERVER METADATA", filed on Mar. 19, 2021, this disclosure of which is incorporated herein by reference in its entirety.

FIELD

This disclosure relates to computer systems and, more specifically, to remote file storage and access.

BACKGROUND

Content management systems or enterprise content management systems are often used to store files and other data for access by users of an organization's computers.

In a content management system (e.g., OpenText™ Content Server), there is no easy way to firstly "understand" the data that is in Content Server as a whole. Further, if there was such an understanding (so for example all documents that were about a particular topic), assuming these are "spread out" across Content Server, there is no way to easily record in Content Server those documents as being about a particular topic.

There is a desire to update the metadata for documents in a content management system (i.e., Content Server) based on the content of those documents. In Content Server, this metadata takes the form of Content Server categories & attributes, Content Server classifications and Content Server records management classifications.

SUMMARY

A system and method of updating Content Server metadata in order to record the "understanding" of what is in documents that are already stored in a content management system (i.e., Content Server). A content management system includes a tool for setting Content Server metadata attributes, based on values in the index. Content Server Category Attributes can be set, as can Content Server Classification values and Content Server RM Classification values.

BRIEF DESCRIPTION OF THE DRAWINGS

The drawings illustrate, by way of example only, embodiments of the present disclosure.

DETAILED DESCRIPTION

This disclosure concerns exposing a remote content management system to a server running the Shinydocs Cognitive Suite. Shinydocs Cognitive Suite is a content management interface system. Information will be transferred from the remote content management system to the Cognitive Suite, which will then be embellished using various automated methods to assign attributes to each of these documents (in the Cognitive Suite). Upon completion, these attributes will be re-synched with the metadata in the remote content management system.

Figure 1:
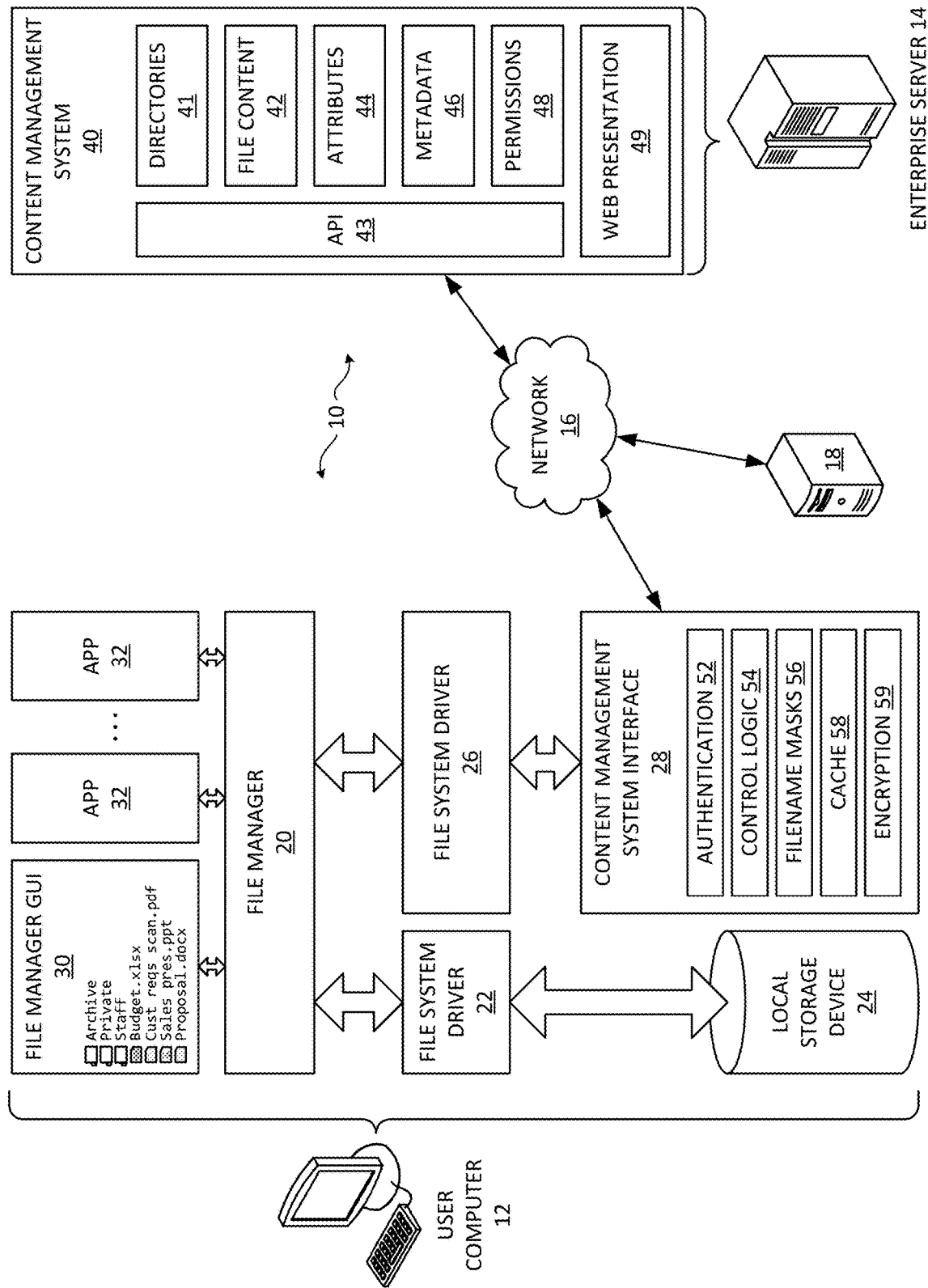
FIG. 1 is a block diagram of a networked computer system.

FIG. 1 shows a networked computer system 10 according to the present invention. The system 10 includes at least one user computer device 12 and at least one server 14 connected by a network 16.

The user computer device 12 can be a device such as a desktop or notebook computer, a smartphone, tablet computer, and the like. The user computer device 12 may be referred to as a computer.

The server 14 is a device such as a mainframe computer, blade server, rack server, cloud server, or the like. The server 14 may be operated by a company, government, or other organization and may be referred to as an enterprise server or an enterprise content management (ECM) system.

The network 16 can include any combination of wired and/or wireless networks, such as a private network, a public network, the Internet, an intranet, a mobile operator's network, a local-area network, a virtual-private network (VPN), and similar. The network 16 operates to communicatively couple the computer device 12 and the server 14.

In a contemplated implementation, a multitude of computer devices 12 connect to several servers 14 via an organization's internal network 16. In such a scenario, the servers 14 store documents and other content in a manner that allows collaboration between users of the computer devices 12, while controlling access to and retention of the content. Such an implementation allows large, and often geographically diverse, organizations function. Document versioning or/and retention may be required by some organizations to meet legal or other requirements.

The system 10 may further include one or more support servers 18 connected to the network 16 to provide support services to the user computer device 12. Examples of support services include storage of configuration files, authentication, and similar. The support server 18 can be within a domain controlled by the organization that controls the servers 14 or it can be controlled by a different entity.

The computer device 12 executes a file manager 20, a local-storage file system driver 22, a local storage device 24, a remote-storage file system driver 26, and a content management system interface 28.

The file manager 20 is configured for receiving user file commands from a user interface (e.g., mouse, keyboard, touch screen, etc.) and outputting user file information via the user interface (e.g., display). The file manager 20 may include a graphical user interface (GUI) 30 to allow a user of the computer 12 to navigate and manipulate hierarchies of folders and files, such as those residing on the local storage device 24. Examples of such include Windows® Internet Explorer and macOS® Finder. The file manager 20 may further include an application programming interface (API) exposed to one or more applications 32 executed on the computer 12 to allow such applications 32 to issue commands to read and write files and folders. Generally, user file commands include any user action (e.g., user saves a document) or automatic action (e.g., application's auto-save feature) performed via the file manager GUI 30 or application 32 that results in access to a file. The file manager GUI 30 and API may be provided by separate programs or processes. For the purposes of this disclosure, the file manager 20 can be considered to be one or more processes and/or programs that provide one or both of the file manager GUI 30 and the API.

The local-storage file system driver 22 is resident on the computer 12 and provides for access to the local storage device. The file system driver 22 responds to user file commands, such as create, open, read, write, and close, to perform such actions on files and folders stored on the local storage device 24. The file system driver 22 may further provide information about files and folders stored on the local storage device 24 in response to requests for such information.

The local storage device 24 can include one or more devices such as magnetic hard disk drive, optical drives, solid-state memory (e.g., flash memory), and similar.

The remote-storage file system driver 26 is coupled to the file manager 20 and is further coupled to the content management system interface 28. The file system driver 26 maps the content management system interface 28 as a local drive for access by the file manager 20. For example, the file system driver 26 may assign a drive letter (e.g., "H:") or mount point (e.g., "/Enterprise") to the content management system interface 28. The file system driver 26 is configured to receive user file commands from the file manager 20 and output user file information to the file manager 20. Examples of user file commands include create, open, read, write, and close, and examples of file information include file content, attributes, metadata, and permissions. The remote-storage file system driver 26 can be based on a user-mode file system driver.

The remote-storage file system driver 26 can be configured to delegate callback commands to the content management system interface 28. The callback commands can include file system commands such as Open, Close, Cleanup, CreateDirectory, OpenDirectory, Read, Write, Flush, GetFileInformation, GetAttributes, FindFiles, SetEndOfFile, SetAttributes, GetFileTime, SetFileTime, LockFile, UnLockFile, GetDiskFreeSpace, GetFileSecurity, and SetFileSecurity.

The content management system interface 28 is the interface between the computer 12 and the enterprise server 14. The content management system interface 28 connects, via the network 16, to a content management system 40 hosted on the enterprise server 14. As will be discussed below, the content management system interface 28 can be configured to translate user commands received from the driver 26 into content management commands for the remote content management system 40.

The content management system interface 28 is a user-mode application that is configured to receive user file commands from the file manager 20, via the driver 26, and translate the user file commands into content management commands for sending to the remote content management system 40. The content management system interface 28 is further configured to receive remote file information from the remote content management system 40 and to translate the remote file information into user file information for providing to the file manager 20 via the driver 26.

The remote content management system 40 can be configured to expose an API 43 to the content management system interface 28 in order to exchange commands, content, and other information with the content management system interface 28. The remote content management system 40 stores directory structures 41 containing files in the form of file content 42, attributes 44, metadata 46, and permissions 48. File content 42 may include information according to one or more file formats (e.g., ".docx", ".txt", ".dxf", etc.), executable instructions (e.g., an ".exe" file), or similar. File attributes 44 can include settings such as hidden, read-only, and similar. Metadata 46 can include information such as author, date created, date modified, tags, file size, and similar. Permissions 48 can associate user or group identities to specific commands permitted (or restricted) for specific files, such as read, write, delete, and similar.

The remote content management system 40 can further include a web presentation module 49 configured to output one or more web pages for accessing and modifying directory structures 41, file content 42, attributes 44, metadata 46, and permissions 48. Such web pages may be accessible using a computer's web browser via the network 16. The web presentation module 49 can be a problematic interface and is not discussed further here.

The content management system interface 28 provides functionality that can be implemented as one or more programs or other executable elements. The functionality will be described in terms of distinct elements, but this is not to be taken as limiting. In specific implementations, not all of the functionality needs to be implemented.

The content management system interface 28 includes an authentication component 52 that is configured to prompt a user to provide credentials for access to the content management system interface 28 and for access to the remote content management system 40. Authentication may be implemented as a username and password combination, a certificate, or similar, and may include querying the enterprise server 14 or the support server 18. Once the user of the computer device 12 is authenticated, he or she may access the other functionality of the content management system interface 28.

The content management system interface 28 includes control logic 54 configured to transfer file content between the computer 12 and the server 14, apply filename masks, evaluate file permissions and restrict access to files, modify file attributes and metadata, and control the general operation of the content management system interface 28. The control logic 54 further affects mapping of remote paths located at the remote content management system 40 to local paths presentable at the file manager 20. Path mapping permits the user to select a file via the final manager 20 and have file information and/or content delivered from the remote content management system 40. In one example, the remote files and directories are based on a root path of "hostname/directory/subdirectory" that is mapped to a local drive letter or mount point and directory (e.g., "H:/hostname/directory/subdirectory").

The content management system interface 28 includes filename masks 56 that discriminate between files that are to remain local to the computer 12 and files that are to be transferred to the remote content management system 40. Temporary files may remain local, while master files that are based on such temporary files may be sent to the remote content management system 40. This advantageously prevents the transmission of temporary files to the remote content management system 40, thereby saving network bandwidth and avoiding data integrity issues (e.g., uncertainty and clutter) at the remote content management system 40.

The content management system interface 28 includes a cache 58 of temporary files, which may include working versions of files undergoing editing at the user computer device 12 or temporary files generated during a save or other operating of an application 32.

The content management system interface 28 includes an encryption engine 59 configured to encrypt at least the cache 58. The encryption engine 59 can be controlled by the authentication component 52, such that a log-out or time out triggers encryption of the cache 58 and successful authentication triggers decryption of the cache 58. Other informational components of the content management system interface 28 may be encrypted as well, such as the filename masks 56. The encryption engine 59 may conform to an Advanced Encryption Standard (AES) or similar.

Figure 2:
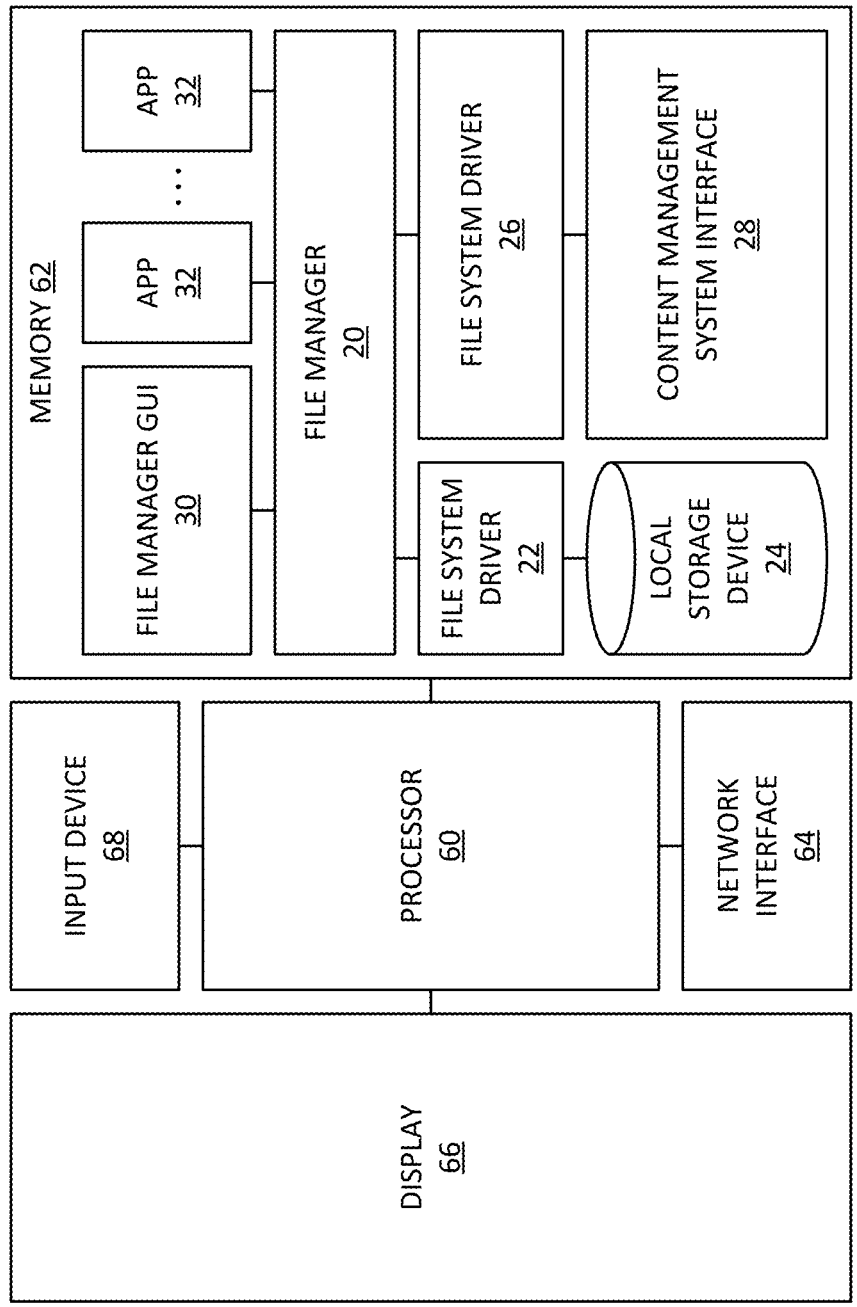
FIG. 2 is a block diagram of a user computer device.

FIG. 2 shows an example of a user computer device 12. The computer device 12 includes a processor 60, memory 62, a network interface 64, a display 66, and an input device 68. The processor 60, memory 62, network interface 64, display 66, and input device 68 are electrically interconnected and can be physically contained within a housing or frame.

The processor 60 is configured to execute instructions, which may originate from the memory 62 or the network interface 64. The processor 60 may be known as CPU. The processor 60 can include one or more processors or processing cores.

The memory 62 includes a non-transitory computer-readable medium that is configured to store programs and data. The memory 62 can include one or more short-term or long-term storage devices, such as a solid-state memory chip (e.g., DRAM, ROM, non-volatile flash memory), a hard drive, an optical storage disc, and similar. The memory 62 can include fixed components that are not physically removable from the client computer (e.g., fixed hard drives) as well as removable components (e.g., removable memory cards). The memory 62 allows for random access, in that programs and data may be both read and written.

The network interface 64 is configured to allow the user computer device 12 to communicate with the network 16 (FIG. 1). The network interface 64 can include one or more of a wired and wireless network adaptor as well as a software or firmware driver for controlling such adaptor.

The display 66 and input device 68 form a user interface that may collectively include a monitor, a screen, a keyboard, keypad, mouse, touch-sensitive element of a touch-screen display, or similar device.

The memory 62 stores the file manager 20, the file system driver 26, and the content management system interface 28, as well as other components discussed with respect to FIG. 1. Various components or portions thereof may be stored remotely, such as at a server. However, for purposes of this description, the various components are locally stored at the computer device 12. Specifically, it may be advantageous to store and execute the file manager 20, the file system driver 26, and the content management system interface 28 at the user computer device 12, in that a user may work offline when not connected to the network 16. In addition, reduced latency may be achieved. Moreover, the user may benefit from the familiar user experience of the local file manager 20, as opposed to a remote interface or an interface that attempts to mimic a file manager.

Figure 3:
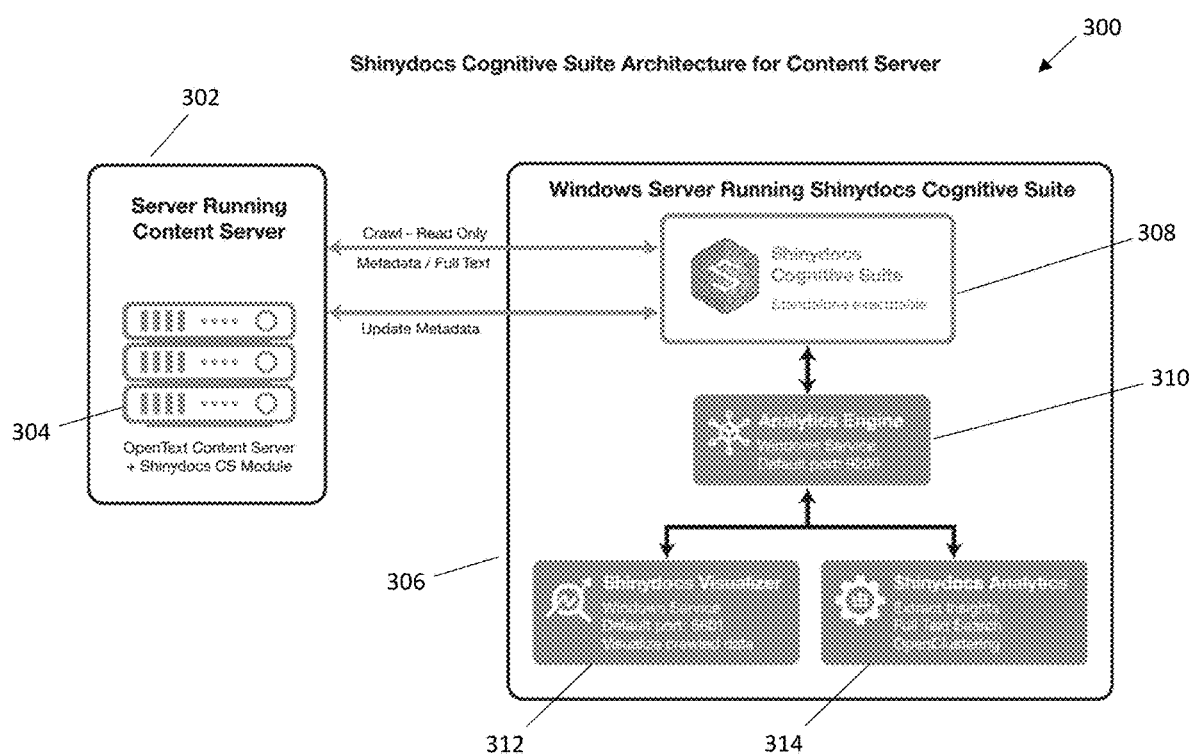
FIG. 3 is a schematic diagram illustrating a content management interface system.

FIG. 3 is a schematic diagram illustrating a content management interface system. Content management interface system 300 as described in FIG. 3 consists of a Content Server 302. An example of Content Server includes the OpenText™ Content Server. Content Server connects to a database which may be an Oracle database, Microsoft SQL Server, or any other database system.

A Content Server Module (CS Module) 304 is installed within Content Server to enable communication and synchronization of data. The CS Module connects via REST for interfacing with an external server running the Shinydocs Cognitive Suite Toolkit 306. Shinydocs Cognitive Suite Toolkit 306 further comprises a Shinydocs Cognitive Suite server 308, an Analytics Engine module 310, a Shinydocs Visualizer module 312 and a Shinydocs Analytics module 314.

According to the disclosure, content management systems such as Content Server 302 may utilize such utilities as Shinydocs Cognitive Suite Toolkit 306 for setting Content Server metadata attributes. Content Server Category Attributes can be set, as can Content Server Classification values, as can Content Server RM Classification values.

UpdateProperties Tool

According to this disclosure, content management interface system such as Shinydocs Cognitive Suite may consist of software tools to assist in data management. One such tool is the UpdateProperties software tool. The idea behind this software tool is that before using this tool, one must perform the following functions:

Crawl Content Server

Add Hash and extracted text from Content Server

Add classifications, or manually set classification values

In other words, one has to crawl and extract document from Content Server and apply classifications and insights to that data in the Index. Now, if one wanted to do this "in place", one basically needs to "update" the metadata in Content Server for these documents (i.e., updating Content Server Categories & Attributes).

Accordingly, the advantage of utilizing the UpdateProperties tool is that one can leverage the power of the Shinydocs Cognitive Suite (or a similar software application) to add Insights (tags) to metadata that was obtained by crawling Content Server, and then "resync" these Insights (tags) to the metadata in Content Server. In Content Server, this would be updating the fields "Cats" & "Atts", or Content Server Classification values, or even Content Server RM Classifications values.

According to embodiments of this disclosure, requiring such a tool is a typical outcome of a customer who has migrated documents into Content Server quickly, without bothering to understand those documents before they were migrated. This migration could have been done with any number of tools. Once in Content Server, there is no native way to easily tell what the contents are for each document (other than manually opening each). In this scenario, leveraging only Content Server capability, the length of time to classify just a single document would be lengthy (perhaps 10 minutes per document). Considering therefore the time required to classify 100,000 documents in this manner, it would take 1 million minutes (e.g., about 2 years) for 1 person to complete.

Furthermore, since Shinydocs has the ability to crawl this information in place (in Content Server), and then run our suite of automated classification tools (by path, by keyword, by pattern matching and by finding similar documents), we can classify these documents in sub-second processing time. So, with a speed of classifying at least 10 documents per second, the time required to classify 100,000 documents with our approach would be 10,000 seconds (e.g., about 3 hours). Classification is done in our Index—the UpdateProperties tool would then be run to "re-sync" the classification information in our Index by updating metadata in Content Server for those documents.

According to further embodiments of the disclosure, the disclosed system utilizes automation to classify documents and once classifications are recorded in the Index, this information can be automatically added to Content Server metadata (categories & attributes, Content Server classifications or Content Server Records Management classifications) with further capabilities of full visualization and speed of matching and marking up data in the index.

According to further disclosures, the disclosed system (e.g., Cognitive Toolkit) provides a further use of the UpdateProperties tool to move content within Content Server, while optionally setting Content Server Category Attribute values, as found in the Index (e.g., UpdateProperties, Parent-ID field).

Just as classifications can be added to our Index, the designation of a new "parent" can also be recorded for any desired documents, which is then re-synced with Content Server effectively "moving" the document to a new location. The need for reorganizing files in this manner "in place" on Content Server is a typical outcome of a customer who has migrated documents into Content Server quickly, without bothering to first organize where they should go. Once in Content Server, files can be moved individually with the native interface, but with the Cognitive Toolkit, this operation can be done at scale, across many documents at once.

According to further embodiments, a computer-implemented method of updating metadata of content management system data is disclosed. The computer-implemented method consists of providing a computer processor, configuring the processor to couple with a network interface and configuring the processor, by a set of executable instructions storable in a memory, to operate a file manager storable in the memory.

According to the disclosure, the file manager comprises a graphic user interface and an application program interface (API) for receiving a plurality of user file commands from at least one application executed by the processor and outputting user file information and operating a content management system interface storable in the memory.

According to the disclosure, the content management system interface comprises control logic and is configured to crawl and extract metadata from the content management system data to create an index. Furthermore, based on the index, extract document binaries from the content management system in order to calculate hash and extract full text, which is added to the index.

According to the disclosure, insights are added to the index, using queries that define specific records to match and the specific insights to add to the index. Finally, metadata attributes are updated in the content management system based on these insights, the original document IDs (keys) are already recorded in the index for each document, so that the corresponding entry in the content management system can be located and updated.

According to the disclosure, the insights consist of custom tagged fields in the index and the records to match further are based on path, metadata values or extracted text. Furthermore, the specified insights consist of fixed tag values. The metadata attributes include such fields as Categories and Attributes. The step of adding insights to metadata is obtained by crawling the content management system.

According to further embodiments of the disclosure, the computer-implemented method consists of executing an UpdateProperties software tool. The computer-implemented method further comprises the step of resynching the Insights tag. The computer-implemented method further comprises the step of adding hash and extracting texts from content management system.

According to further embodiments of the disclosure, the computer-implemented method further comprises the step of adding hash and extracting texts from content management system. The computer-implemented method further comprises the step of adding classification data.

According to further embodiments, a system of updating metadata of content management system data is disclosed. The system consists of a computer processor, a computer memory, a file manager, a network interface coupled to the computer processor, a set of executable instructions storable in the computer memory, to operate the file manager storable in the memory and a content management system interface storable in the computer memory.

According to the disclosure, the content management system interface consists of control logic and configured to crawl and extract information from the content management system data to create an index, receive at least one metadata attribute from a software tool from fields of the content management system data, update the metadata attribute in the content management system and storing and synchronizing the metadata attributes as updated values in the content management system.

According to further embodiments of the disclosure, the file manager further comprises a graphic user interface (GUI). The file manager further comprises an application program interface (API) for receiving a plurality of user file commands from at least one application executed by the processor and outputting user file information.

According to further embodiments of the disclosure, the software tool of the system is an UpdateProperties software application tool. The metadata attributes include Categories and Attributes fields. The system further comprises adding insights tags to metadata, obtained by crawling the content management system and resynching the insights tag. The system further comprises step of adding hash and classification and extracting text from the content management system.

According to further embodiments a computer program product, encoded on one or more non-transitory computer storage media, comprising instructions that when executed by a processor cause the processor to perform operations. The computer program product consists of the steps of crawling and extracting information from the content management system data to create an index, receiving at least one metadata attribute from a tool from fields of the content management system data, updating the metadata attribute in the content management system and storing and synchronizing the metadata attributes as updated values in the content management system.

Implementations disclosed herein provide systems, methods and apparatus for generating or augmenting training data sets for machine learning training. The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor. A "module" can be considered as a processor executing computer-readable code.

A processor as described herein can be a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, or microcontroller, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. In some embodiments, a processor can be a graphics processing unit (GPU). The parallel processing capabilities of GPUs can reduce the amount of time for training and using neural networks (and other machine learning models) compared to central processing units (CPUs). In some embodiments, a processor can be an ASIC including dedicated machine learning circuitry custom-build for one or both of model training and model inference.

The disclosed or illustrated tasks can be distributed across multiple processors or computing devices of a computer system, including computing devices that are geographically distributed. The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on." While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

What is claimed is:

1. A computer-implemented method of updating metadata from a content management system data comprising the steps of:
   providing a computer processor;
   configuring the processor to couple with a network interface; and
   configuring the processor, by a set of executable instructions storable in a memory, to operate a file manager, the file manager comprising a graphic user interface and an application program interface (API) for receiving a plurality of user file commands from at least one application executed by the processor and outputting user file information; and
   operate content management system interface, the content management system interface comprising control logic and configured to:
   crawl and extract metadata from the content management system data to create an index;
   based on the index, extract document binaries from the content management system data in order to calculate hash and extract full text, which is added to the index;
   add insights in the index, using queries that define specific records to match and specific insights to add to the index;
   update metadata attributes in the content management system data based on the insights and one or more original document IDs (keys) are recorded in the index for each document, wherein a corresponding entry in the content management system data can be located via stored and updated original document IDs;
   wherein the method is further configured to add hash data, add classification data and extract text from the content management system data.

2. The method of claim 1 wherein the insights consist of custom tagged fields in the index.

3. The method of claim 1 wherein the records to match further is based on path, metadata values or extracted text.

4. The method of claim 1 wherein the specified specific insights consist of fixed tag values.

5. The method of claim 1 further comprises executing an UpdateProperties software tool.

6. The method of claim 1 wherein the metadata attributes include such fields as Categories and Attributes.

7. The method of claim 1 wherein adding insights to metadata is obtained by crawling the content management system data.

8. The method of claim 1 further comprising step of resynching the insights.

* * * * *